United States Patent
Liu

(10) Patent No.: US 9,562,434 B2
(45) Date of Patent: Feb. 7, 2017

(54) OSCILLATING FOIL TURBINE

(75) Inventor: Pengfei Liu, Newfoundland (CA)

(73) Assignee: National Research Council of Canada, Ottawa, Ontario (CA)

( * ) Notice: Subject to any disclaimer, the term of this patent is extended or adjusted under 35 U.S.C. 154(b) by 828 days.

(21) Appl. No.: 13/882,396

(22) PCT Filed: Nov. 2, 2011

(86) PCT No.: PCT/CA2011/001224
§ 371 (c)(1),
(2), (4) Date: Apr. 29, 2013

(87) PCT Pub. No.: WO2012/058761
PCT Pub. Date: May 10, 2012

(65) Prior Publication Data
US 2013/0216381 A1    Aug. 22, 2013

Related U.S. Application Data

(60) Provisional application No. 61/409,639, filed on Nov. 3, 2010.

(51) Int. Cl.
F01D 5/00 (2006.01)
F03B 13/26 (2006.01)
(Continued)

(52) U.S. Cl.
CPC .............. F01D 5/00 (2013.01); F03B 13/264 (2013.01); F03B 17/06 (2013.01); F03D 5/06 (2013.01);
(Continued)

(58) Field of Classification Search
CPC ... F03B 13/16; F03B 13/1815; F03B 13/1845; F03D 5/06
See application file for complete search history.

(56) References Cited

U.S. PATENT DOCUMENTS 2,465,285 A    3/1949    Schwickerath
3,509,717 A    5/1970    Bolano
(Continued)

FOREIGN PATENT DOCUMENTS

CA    2365650    3/2003
CA    2365650    6/2003
(Continued)

OTHER PUBLICATIONS

P. Liu / Energy 35 (2010) 2843-2851—Journal of Energy Reprint.
(Continued)

*Primary Examiner* — John K Fristoe, Jr.
*Assistant Examiner* — Brian O Peters
(74) *Attorney, Agent, or Firm* — Jason E. J. Davis

(57) ABSTRACT

An oscillating foil turbine has a foil having a first fluid dynamic surface for producing lift in a fluid flow, a support for the foil, and a second fluid dynamic surface, wherein the support allows for cyclic motion of the first and second surfaces with respect to each other. A driven member is provided to tap energy from flow throughout each cycle. Throughout at least part of the cyclic translation, the fluid dynamic surfaces are oriented sufficiently parallel, and separated by a distance that is sufficiently small, to achieve a substantial wing-in-ground effect.

32 Claims, 4 Drawing Sheets

(51) Int. Cl.
  *F03B 17/06* (2006.01)
  *F03D 5/00* (2006.01)
  *F03D 5/06* (2006.01)

(52) U.S. Cl.
  CPC ............... *Y02E 10/28* (2013.01); *Y02E 10/38* (2013.01); *Y02E 10/70* (2013.01)

(56) References Cited

U.S. PATENT DOCUMENTS

| | | | |
|---|---|---|---|
| 3,978,345 A | 8/1976 | Bailey | |
| 3,995,972 A * | 12/1976 | Nassar | F03D 5/06 415/2.1 |
| 4,048,947 A | 9/1977 | Sicard | |
| 4,428,712 A | 1/1984 | Wuenscher et al. | |
| 4,551,066 A | 11/1985 | Frisz | |
| 4,915,584 A * | 4/1990 | Kashubara | F03D 5/06 416/64 |
| 5,324,169 A * | 6/1994 | Brown | F03B 17/06 416/17 |
| 5,548,956 A | 8/1996 | Price | |
| 5,899,664 A | 5/1999 | Lawrence | |
| 6,153,944 A | 11/2000 | Clark | |
| 6,217,284 B1 | 4/2001 | Lawrence | |
| 6,273,680 B1 * | 8/2001 | Arnold | F03B 17/00 416/1 |
| 6,323,563 B1 | 11/2001 | Kallenberg, Jr. | |
| 6,731,018 B1 | 5/2004 | Grinsted et al. | |
| 6,849,963 B2 | 2/2005 | Grinsted et al. | |
| 6,877,692 B2 | 4/2005 | Liu | |
| 6,884,020 B2 | 4/2005 | Kaare, Jr. et al. | |
| 7,275,891 B2 | 10/2007 | Owen et al. | |
| 7,471,006 B2 | 12/2008 | Janca et al. | |
| 7,493,759 B2 | 2/2009 | Bernitsas | |
| 7,611,307 B2 | 11/2009 | Owen et al. | |
| 7,632,069 B2 | 12/2009 | Kelley | |
| 7,649,275 B2 | 1/2010 | Janca et al. | |
| 7,654,082 B2 | 2/2010 | Perry et al. | |
| 7,686,583 B2 | 3/2010 | Siegel | |
| 2006/0275109 A1 | 12/2006 | Paish | |
| 2007/0176430 A1 | 8/2007 | Hammig | |
| 2007/0297903 A1 | 12/2007 | Morris | |
| 2008/0148723 A1 | 6/2008 | Birkestrand | |
| 2008/0152495 A1 | 6/2008 | Sharpe | |
| 2008/0159873 A1 | 7/2008 | Tran | |
| 2008/0247872 A1 | 10/2008 | Akcasu | |
| 2009/0010761 A1 | 1/2009 | Schiel | |
| 2009/0058091 A1 | 3/2009 | Douglas | |
| 2009/0091135 A1 | 4/2009 | Janca et al. | |
| 2009/0121490 A1 | 5/2009 | Platzer et al. | |
| 2009/0191772 A1 | 7/2009 | Wu | |
| 2009/0212572 A1 | 8/2009 | Sundermann | |
| 2009/0218822 A1 | 9/2009 | Rink | |
| 2009/0236858 A1 | 9/2009 | Johnson | |
| 2009/0302612 A1 | 12/2009 | Gartner | |
| 2010/0019504 A1 | 1/2010 | Kelley | |
| 2010/0028150 A1 | 2/2010 | Lawson | |
| 2010/0045046 A1 | 2/2010 | Douglas | |
| 2010/0058754 A1 | 3/2010 | Fong et al. | |
| 2010/0060008 A1 | 3/2010 | Hostetler | |
| 2010/0096856 A1 | 4/2010 | Janca et al. | |
| 2010/0102565 A1 | 4/2010 | Gartner | |
| 2010/0140933 A1 | 6/2010 | Finnigan | |
| 2010/0143115 A1 | 6/2010 | Kerr | |
| 2010/0150716 A1 | 6/2010 | Siegel | |

FOREIGN PATENT DOCUMENTS

| | | |
|---|---|---|
| DE | 3221098 | 12/1983 |
| DE | 10358240 | 6/2005 |
| DE | 102008057731 | 5/2010 |
| GB | 443749 | 3/1936 |
| GB | 610149 | 10/1948 |
| GB | 2002456 | 2/1979 |
| GB | 2131489 | 6/1984 |
| GB | 2414279 | 11/2005 |
| GB | 2417758 | 3/2006 |
| GB | 2417760 | 3/2006 |
| GB | 2450077 | 12/2008 |
| GB | 2453537 | 4/2009 |
| GB | 2462320 | 2/2010 |
| GB | 2464744 | 4/2010 |
| JP | 57137654 | 8/1982 |
| JP | 59231177 | 12/1984 |
| WO | 8000991 | 5/1980 |
| WO | 9201153 | 1/1992 |
| WO | 9421913 | 9/1994 |
| WO | 2004110859 | 12/2004 |
| WO | 2005024226 | 3/2005 |
| WO | 2005090777 | 9/2005 |
| WO | 2005108781 | 11/2005 |
| WO | 2006/093790 | 9/2006 |
| WO | 2006093790 | 9/2006 |
| WO | 2008144938 | 4/2008 |
| WO | 2008053167 | 5/2008 |
| WO | 2008123154 | 10/2008 |
| WO | 2009/068850 | 6/2009 |
| WO | 2009068850 | 6/2009 |
| WO | 2010004286 | 1/2010 |
| WO | 2010012029 | 2/2010 |
| WO | 2010015821 | 2/2010 |
| WO | 2010062170 | 6/2010 |
| WO | 2010077150 | 7/2010 |
| WO | 2012/040834 | 4/2012 |
| WO | 2012040834 | 4/2012 |

OTHER PUBLICATIONS

Liu, Pengfei—Energy 35 (2010) 2843-2851 "A computational hydrodynamics method for horizontal axis turbine—Panel method modeling migration from propulsion to turbine energy".

Liu, Pengfei—Applied Ocean Research 32 (2010) 103-112 "Propulsion characteristics of wing-in-ground effect dual-foil propulsors".

Pulse Tidal Powered by Nature—prior art more-power-per-machine—http://pulsetidal.com/more-power-per-machine.html.

InfoSciTech Information Consultants Inc.—Search Results.

Michael M. Bemitsas, Kamaldev Raghavan, Y. Ben-Simon, E.M.H. Garcia—"VIVACE (Vortex Induced Vibration Aquatic Clean and Renewable Energy From Fluid Flow", Journal of Offshore Mechanics and Arctic Engineering, Nov. 2008, vol. 130 / p. 041101.

Michael M. Bemitsas, Y. Ben-Simon, Kamaldev Raghavan, E.M.H. Garcia—"The VIVACE Converter: Model Tests at High Damping and Reynolds Number Around 105", Journal of Offshore Mechanics and Arctic Engineering, Feb. 2009, vol. 131 / p. 011102-1.

K. D. Jones, K. Lindsey, M. F. Platzer—"An Investigation of the Fluid-Structure Interaction in an Oscillating-Wing Micro-Hydropower Generator", Calhoun (Dudley Knox Library): The NPS Institutional Archive, Faculty and Researcher Publications, 2003, Department of Aeronautics & Astronautics, Naval Postgraduate School, CA, USA.

T. Kinsey, G. Dumas—"Parametric Study of an Oscillating Airfoil in a Power-Extraction Regime", AIAA Journal, vol. 46, No. 6, Jun. 2008, p. 1318-1330, University Laval, Quebec City, Quebec, Canada.

William McKinney, James DeLaurier—"The Wingmill: An Oscillating-Wing Windmill", Journey of Energy, vol. 5, No. 2, Mar.-Apr. 1981, p. 109-115, AIAA 80-0621R, University of Toronto, Toronto, Canada.

Contractor: The Engineering Business Limited, "Research and Development of a 150kW Tidal Stream Generator", ETSU T/06/00211/00/REP, DTI pub URN no 02/1400, First Published 2002, Crown Copyright 2002.

Contractor: The Engineering Business Ltd, "Stingray Tidal Stream Energy Device—Phase 2", T/06/00218/00/REP, URN 03/1433, First published 2003.

Contractor: The Engineering Business Ltd, "Stingray Tidal Stream Energy Device—Phase 3", T/06/00230/00/REP, URN 05/864, First published 2005, Crown Copyright 2005.

(56) References Cited

OTHER PUBLICATIONS

J. M. Anderson, K. Streitlein, D.S. Barrett and M. S. Triantafyllou—"Oscillating Foils of High Propulsive Efficiency", Journal of Fluid Mechanics, 1998, vol. 360, p. 41-72, Cambridge University Press, United Kingdom.
T. Kinsey, G. Dumas, G. Lalande, J. Ruel, A. Mehut, P. Viarouge, J. Lemay, Y. Jean—"Prototype Testing of a Hydrokinetic Turbine Based on Oscillating Hydrofoils", Renewable Energy, 2011, vol. 36, p. 1710-1718, Laval University, Quebec City, Quebec, Canada.
T. Kinsey, G. Dumas—"Testing and Analysis of an Oscillating Hydrofoils Turbine Concept", ASME 2010 3rd Joint US-European Fluids Engineering Summer Meeting, Paper FEDSM-ICNMM2010-30869, Aug. 1-5, 2010, Montreal, Canada.
The European Marine Energy Centre Ltd (EMEC), 2010: http//www.emec.org.uk/tidal_devices.asp.
Pulse Generation Ltd. 2010, Hull, UK: http://www.pulsegeneration.co.uk/.
Pulse Tidal Ltd. 2010, Sheffield, UK: http://www.pulsetidal.com and/or http://www.pulsetidal.co.uk/company.
Erjie Cuit and Xin Zhang—"Incompressible Flows and Aerodynamics", Ground Effect Aerodynamics, Chapter 18, p. 245-256, Encyclopedia of Aerospace Engineering, 2010 John Wiley & Sons, Ltd.
Tomasz Abramowski—"Numerical Investigation of Airfoil in Ground Proximity", Journal of Theoretical and Applied Mechanics, V. 45, 2, p. 425-436, Warsaw 2007.
Extended European Search Report dated Jan. 8, 2016 for application No. 11837363.8.

\* cited by examiner

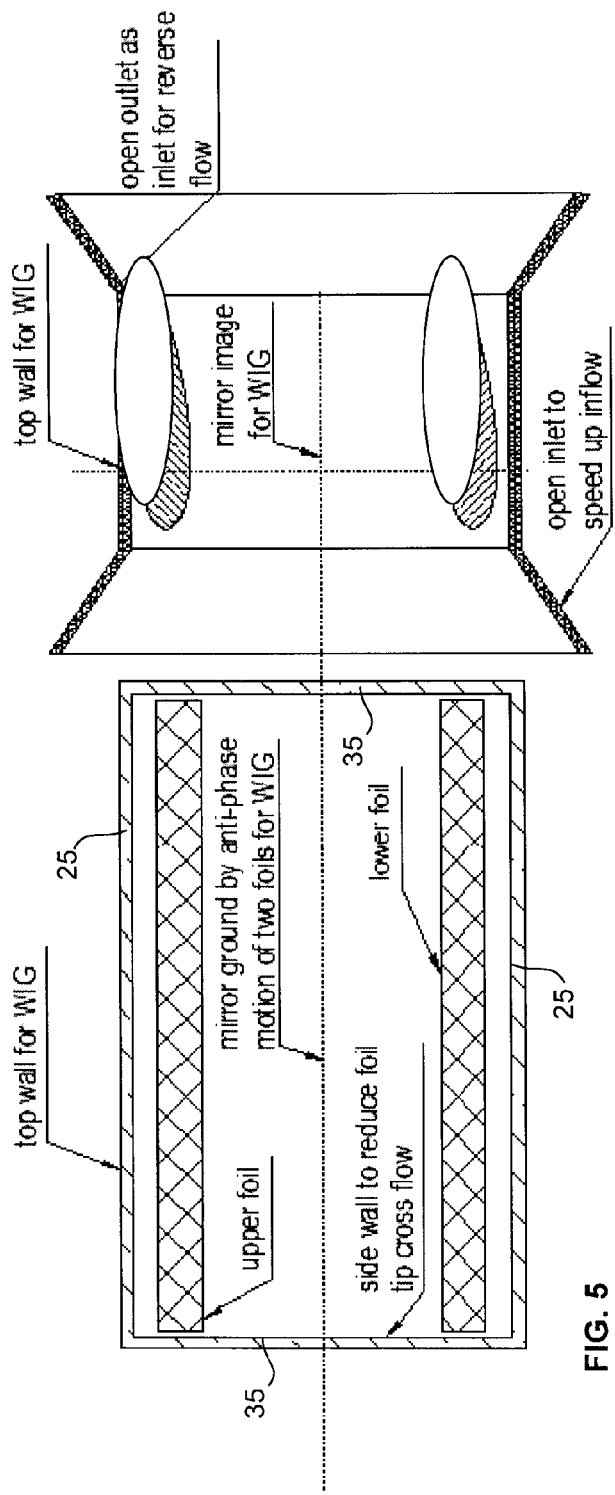
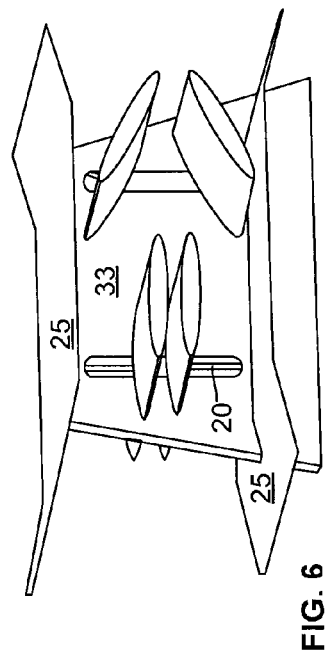
FIG. 5
FIG. 6

OSCILLATING FOIL TURBINE

This application is a national phase entry of International Patent Application PCT/CA2011/001224 filed Nov. 2, 2011 and claims the benefit of United States Provisional Patent Application U.S. Ser. No. 61/409,639 filed Nov. 3, 2010, the entire contents of both of which are herein incorporated by reference.

FIELD OF THE INVENTION

The present invention relates in general to oscillating foil turbines for tapping energy of a fluid flow, and in particular, to oscillating foil arrangements configured to leverage a wing-in-ground effect, to improve efficiency and maximize power capacity of energy harvesting, and to improve the applicability of turbines in shallow flows.

BACKGROUND OF THE INVENTION

Renewable energy tapped from tidal or wind forces has been demonstrated in several ways. Various hydrofoil/airfoil turbine designs have been designed and deployed as electrical power generators. The majority of these turbines are coupled to electrical generators to produce electricity, and most use either horizontal or vertical axis with rotor blades to tap energy from the flow, that requires relatively high threshold inflow speed. While this arrangement provides the most uniform drive throughout the cycle, and therefore provides stable power generation, the energy density of this arrangement leaves something to be desired, and the volume they occupy is large and unwieldy. It is difficult to arrange rotary blade turbines compactly in either horizontal or vertical configuration, and therefore in a manner that efficiently harvests energy over a broad area. The fluid forces on a rotary turbine blade's surface are unevenly distributed because of the uneven velocity distribution across the span of the blades. In addition to efficiency loss, very heavily loaded blade surface in the tip region may cause a further efficiency reduction due to compressibility effect for wind turbine blades and due to cavitation for tidal turbine blades. Cavitation, in addition to being a source of noise and vibration, is known to fracture tidal turbine blades.

In underwater embodiments, high velocity flows tend to be confined to substantially planar features. Uniform flows are therefore provided within regions that are frequently limited in depth, but are frequently expansive in length and width. Furthermore, many bodies of water are required for surface vehicle navigation and so minimum depths of water clearance must be maintained. Oscillating foil turbines occupy less depth and hence provide more water clearance for a given span, and thus requires less water depth, and can be deployed in a greater variety of locations. Deep water operation demands much higher cost in design, fabrication of turbines, and in installation, maintenance and operations. Oscillating foil turbines are friendlier to marine creatures and less prone to catch fishing nets and seaweed. There are therefore several reasons for seeking viable oscillating foil turbine designs.

The idea of oscillating foil turbines has been around for many years. Instead of spinning blades of rotary blade turbines, you oscillate the foil, typically translating the foil in a direction perpendicular to the direction of flow. Most often oscillating foil turbines displace only in heave and pitch directions, although other motions are known such as motions that additionally involve surge displacements. Foils are known to have different amounts of lift depending on the effective angle of attack (pitch), and as a result of an oscillating foil's instantaneous motion with respect to the direction of flow. By controlling the pitch angle to provide the maximum possible positive lift during a first stroke (typically called an "up" stroke, regardless of orientation), and nearly equal negative lift during a second ("down") stroke, a substantial net power per cycle may be obtained with an oscillating foil.

These generators can be deployed in isolated coastal communities, inland water ways, and on off-shore installations, as well as for extremely large power generation. Such generators have small environmental impact compared with dams, relatively low installation and operating costs, and do not require highly special coastal geology or marine current dynamics, making them very attractive. However they are still not accepted in the power generation industry and the technology remains substantially underdeveloped.

Pulse Tidal (UK) has a website showing two pairs of oscillating hydrofoils on a single submersible deck. The two pairs are separated horizontally, side-by-side facing the flow, and the two pairs of the foils are in tandem (one fore and the other aft). The paired foils are shown operating 180° out of phase, so that while one foil is on a power stroke, the other is on the return stroke, and vice versa. Furthermore, the second pair is 90° out of phase with respect to the first pair, as the foils of the first pair are near the transitions between power and return strokes, and the second pair is in a middle of the power and return strokes. The document does not describe how the foil motion is converted into electricity, although it is clearly shown that the foils are coupled to a pivoting arm structure that has an articulated elbow joint. Consequently the motion of the foils is of a combination of heave, pitch and surge due to the arcurate motion. Surge motion of the foil is the result of the arcurate motion and this motion produces an added inflow velocity during part of the cycle and reduces inflow velocity in equal measure during an opposite part of the cycle. This change in effective flow velocity is generally not preferred as it decreases efficiency of power generation.

Given the separation of the paired foils in the direction of flow, no dynamic wing-in-ground (WIG) effect is produced between the foils in operation. Given the angled elevating structures to which the arm is mounted, and the arcuate course of the foils that provides greatest surge displacements as the foil approaches the ground, no static WIG effect is produced. In operation, these foils generate lift as per normal hydrodynamic forces on a foil.

WO 2009/068850 to Paish teaches a paired oscillating hydrofoil turbine in which foils run in counterphase and bear rotationally symmetrically on a crankshaft. The foils are pivotably mounted to a frame and a pitch control is provided by a linear actuator attached to the pivoting arm. The pushrods coupling the foil to the crankshaft are also coupled to the pivoting arm.

The turbine shown in FIG. 2 of WO 2009/068850 has a lot of frame in the inflow and outflow paths of the turbine, partially occluding the foils and reducing a velocity of the flow. The longer the pushrods, the less pronounced the reduction in velocity of the flow, but the longer the pushrods, the stronger and heavier they need be to reduce losses and the greater the inertia of the turbine.

WO 2009/068850 does not teach or suggest leveraging the WIG effect. At the instant shown in FIG. 2 the foils appear to be somewhat parallel (given the position of the crankpin, one foil is slightly up stream of the other). It will be appreciated that they drive a crankshaft and so only when one foil is mid down stroke, and the other is mid up stroke, the foils will be aligned in the flow. As their directions of motion are opposite, the angles of attack of the foils are therefore pitched in a same direction (one for positive lift, the other for negative lift, but pivoted the other way) when they are closest, so that adjacent sides are one suction and one pressure. This would decrease any WIG effect that might be present at that juncture, if the foils had been close enough to produce a substantial dynamic WIG effect. But in any case the separation of the foils appear to be far greater than 20% of the chord of the foils, and thus would not produce a meaningful WIG effect.

It is known to use WIG effect in propulsion systems for submersible and surface watercraft, as is taught, for example, in Applicant's U.S. Pat. No. 6,877,692. However propulsors have substantially different properties from passive foils that tap energy from steady flows. The foils have low load compared with propulsor foils, and optimization of foils to generate wing-in-ground effect has not been experimented with in power generation. Indeed propulsors would be expected to have very poor properties if used as a turbine for a generator. The turbines known in the art are not designed to leverage the WIG effect. The floor of a body of water can rarely be used as a ground for WIG effect oscillating foil turbines, because substantial clearance to floor has to be maintained for operation safety, and because the inflow velocity is slowest near the large boundary layer on the floor. The power generated generally varies with a cube of the inflow velocity.

There remains a need for higher efficiency, higher power capacity oscillating foil turbines that are suited for deployment in relatively shallow flows.

SUMMARY OF THE INVENTION

Applicant has discovered how a substantial wing-in-ground (WIG) effect can be used to improve efficiency of oscillating foil turbines, using a foil designed to create lift in a fluid flow, the foil having a chord of a given length. The foil is placed in close enough proximity to an effective ground (such as 20% the chord length, more preferably 15% the chord length, more preferably 10% or less the chord length or less), such that at least 80% of the foil (more preferably at least 90%, more preferably 95%, or 100%) is projected on the ground plane in a direction perpendicular to the inflow. This permits a significant WIG effect to augment lift. The effective ground can be provided by a wall (a ceiling or floor for preferred horizontal foils) producing a static WIG effect, or by a fluid-dynamic wall operationally provided between two foils, producing a dynamic WIG effect. The WIG effect is generally enhanced: 1) if the foil moves toward the effective ground; 2) for an asymmetric foil having a flatter and a contoured surface respectively, if it is the flatter surface that approaches the effective ground; and for the dynamic WIG effect, 3) if the adjacent surfaces are both suction surfaces, or both pressurized surfaces. Applicant prefers that the foils are similar, and that they converge and diverge at uniform rates, at least when close, with similar angles of attack to provide a mirror symmetry between the foils. The substantial WIG effect need not be present throughout the whole cycle of the oscillating foils.

In accordance with an aspect of the invention, an oscillating foil turbine is provided for tapping fluid kinetic energy from a flow. The oscillating foil turbine comprising: a first foil having a chord length $I_c$ and a first fluid dynamic surface designed to produce lift, mounted to a support for cyclic oscillation in the flow, with substantial motion in a heave direction; a second fluid dynamic surface operating in the flow to produce an effective ground parallel to a direction of inflow and perpendicular to the heave direction; and a member coupled directly or indirectly to the first foil, adapted to use the heave motion to perform work, wherein throughout a portion of the cycle the first fluid dynamic surface is separated from the effective ground by less than about 20% of $I_c$, and the effective ground has an extent such that at least 80% of the first foil is projected onto the effective ground in the heave direction.

The fluid flow may be a marine flow, such as a reversing marine flow, or wind.

The second fluid dynamic surface may be a wall defining the ground, the wall having an extent such that at least 80% of the foil (more preferably at least 90%, more preferably 95%, or 100%) is projected on the ground plane in a direction perpendicular to the inflow.

Preferably, throughout the portion of the cycle, the first foil moves toward the effective ground. The first foil may be a cambered foil, and the first fluid dynamic surface may be a flat side of the first foil. The first foil may be a reversible foil equally operable in flows in two opposite directions.

The second fluid dynamic surface may be on a second foil moved to operationally provide the effective ground with the first foil, and: the first and second fluid dynamic surfaces are both suction surfaces, or both pressurized surfaces of the first and second foils; the first and second foils are similar in size and contour; the first and second foils converge and diverge at uniform rates throughout the portion of the cycle; the first and second foils converge and diverge at uniform rates throughout the portion of the cycle, with similar angles of attack, to provide a mirror symmetry between the first and second foils; the first and second foils are symmetric; or the first and second foils are cambered, and are mounted to the support with similar surfaces facing.

The support may comprise: a translational joint for coupling the foil to a frame; a guideway through which rigid protrusions of the first foil, pass, providing a translational joint for coupling the foil to a frame; a frame including a pair of slits through which a pair of rigid protrusions disposed at opposite ends of the first foil pass to define a pivot axis of the first foil, the slits and rigid protrusions providing translational joints for coupling the first foil to the pair of slits, the joints substantially preventing the first foil from roll, sway, or yaw motion; a frame including a pair of slits through which a pair of rigid protrusions disposed at opposite ends of the first foil pass to define an axis of the first foil, the slits and rigid protrusions providing revolute, translational joints for coupling the first foil to the frame, substantially preventing the first foil from roll, sway, or yaw motion; a frame including a pair of linear slits through which a pair of rigid protrusions disposed at opposite ends of the first foil pass to define an axis of the first foil, the slits and rigid protrusions providing translational joints for coupling the first foil to the frame, substantially preventing the axis from roll, sway or yaw motion, the slits oriented in the heave direction; or a frame including a pair of linear slits that are aligned when projected in the heave direction, through which a pair of rigid protrusions disposed at opposite ends of the first foil pass to define an axis of the first foil, the slits and rigid protrusions providing translational joints for coupling the first foil to the frame, substantially preventing the axis from roll, sway or yaw motion.

The first and second foils may both be coupled to a frame for controlled variation of angles of attack of the foils during the cycle; for example by a mechanical controller. Each of the first and second foils may be coupled to a frame via an axle of a rotary motor embedded in the foil for controlled variation of an angle of attack of the foil during the cycle, the axle meeting a rotationally bearing surface of the frame or of a drive train for grounding the pitching of the foil, and may further comprise a locking mechanism that is set at a fixed angle of attack at a beginning of each stroke and released at the end of each stroke, whereby the rotary motor operates only during pitching intervals between strokes.

The member coupled to the first foil may be a pushrod extending from the first foil substantially in the heave direction, and the work may be done by the reciprocating pushrod, for example to drive a pump. Alternatively the pushrod may be coupled to a crankshaft for continuous rotation of the crankshaft, and the work may be done by the crankshaft, for example to drive an electrical power generator. Furthermore the pushrod may be coupled to a rack enmeshed with a gear for alternating rotation of a shaft.

The oscillating foil turbine may further comprise a sidewall extending normal to the pitch axis of the foils, and may include two sidewalls extending normal to the pitch axis of the foils at opposite sides of the foil, and two walls extending normal to the heave direction, that collectively enclose a foil chamber in 4 directions.

A multi-stage WIG oscillating foil turbine is provided with improved power continuity; an effective mechanism for converting oscillation power into rotational energy. The WIG oscillating foil turbine may have the following features: the foil may reciprocate in the heave direction with no surge motion of the foils; fully bi-directional operation is possible if elliptical or substantially reversible foils are used; the foils can be supported without obstructing inflow or outflow with substantial machinery; an independently driven pitch motor may be provided for controlling cycle amplitude and frequency; a nozzle/wall design can be used that produces an acceleration of inflow velocity at the foil location (for both upstream and downstream direction of the tidal current inflow if using a bi-directional turbine) with side walls that create winglet effect to reduce losses at tips of the foils.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 5 is a schematic illustration of a single stage of an oscillating foil turbine having a 2-foil structure enclosed to form a nozzle, and having foils with a contour suitable to bidirectional flow: and FIG. 6 is a schematic illustration of an embodiment having pairs of foils that are offset in the surge direction, on both sides of a generator housing.

DESCRIPTION OF PREFERRED EMBODIMENTS

In accordance with the invention, an oscillating foil turbine is provided, having a foil having a first fluid dynamic surface designed to produce lift in a fluid flow, a second fluid dynamic surface, supports for the foil and second fluid dynamic surfaces allowing cyclic motion of the surfaces with respect to each other, and a driven member designed to tap energy from the heave motion of the foils, wherein throughout at least part of the cyclic translation, the fluid dynamic surfaces are oriented sufficiently parallel, and separated by a distance d that is sufficiently small to achieve a substantial wing-in-ground (WIG) effect, such as less than 20% the chord, more preferably less than 15% and most preferably 10% the chord, depending on the maximum thickness of the foil section and material. The foil may be supported for motion along a circuit, the circuit including substantial motion in a direction perpendicular to the flow, e.g. substantially vertically, or more preferably, horizontally.

The WIG effect augments lift on a foil by limiting a rate at which compressed (on the pressure side of the foil) or rarified (on the suction side of the foil) fluid can disperse or draw in ambient fluid, to equalize pressures. An effective ground provides a barrier to the equalizing flow in one direction, and the foil does the same on the other, leaving only a peripheral surface area for the equalizing flow. This peripheral surface area depends on the aspect ratio, area, and the distance d, as well as the flow and motion parameters. For a distance d about 10% of the chord length, a substantial augmentation in lift is produced (50-70% increase) with an improved efficiency which as much as 20%.

Figure 1A:
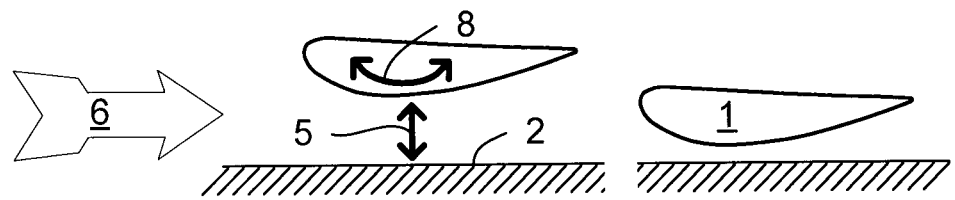
FIGS. 1a, b, and c are schematic illustrations of three embodiments of oscillating foil turbines that leverage the wing-in-ground (WIG) effect.

FIG. 1a, b, and c are schematic illustrations of three embodiments of oscillating foil turbines, of the present invention in two states of operation. The variety of support structures and drive mechanisms compatible with oscillating foil turbines makes them difficult to render schematically, but are represented by the motion indicators and the displacement shown by the foils at two time steps.

FIG. 1a shows a one foil 1, one wall 2 oscillating foil turbine. Circuit arrow 5 schematically illustrates how the foil 1 (side view is presented showing a profile of a particular foil, although others may be used) is constrained to move in a direction (i.e. horizontal, vertical, or other) direction perpendicular to flow 6. While the circuit arrow 5 is shown travelling linearly, it will be appreciated that the circuit may include some motion in a direction of flow, and could even have equal motions in both the direction perpendicular to flow and in the direction of the flow. The circuit may be a circular loop/raceway, for example. It is well known to use pitch control to vary a lift of the foil 1, and that for increasing angles (before a stalling angle of attack), lift increases. By tilting the foil 1 so that it has a negative angle of attack, a reversed foil is presented, and some lift in a negative direction can be obtained. Given that the section of foil 1 is cambered (asymmetric), a desired lift is readily achieved with a small pitch displacement during the up stroke. While a more substantial pitch is required to generate equal negative to the lift during the down stroke, it is presently preferred to do so, to produce substantially uniform power throughout both strokes, leaving only low power generation intervals during a pitching interval between the strokes. The pitching interval permits the reorientation of the foils to alter the angle of attack of the foil, prior to commencing the next stroke. Advantageously the foil is substantially reoriented by the force of the stream and inertia. This can also be achieved by an automatic pitch control logic when using symmetric foils (section-wise), with the added feature that equal pitching angles are used for both strokes.

It is essential that the net force applied during a nominal cycle, be provided if power is to be tapped from the flow, and this can be provided by changing fluid dynamic conditions systematically between the two strokes. Generally external control over the flow requires powerful equipment. While lift control arrow 8 is shown as a pivoting of the foil 1 to vary an angle of attack, as if foil 1 were mounted for pivotal connection about an axis passing through foil 1, other alternatives are contemplated. If the lift alone drives the foil through the circuit, the lift control cycle (assuming steady flow) controls the circuit motion. If so, a faster lift control frequency, beyond an optimal length, yields a smaller circuit, and a slower lift control frequency leads to dwell time at the ends of the cycles.

Foil 1 is shown in side view, showing a profile of a particular foil, although others may be used. The foil 1 is constrained to move in a direction perpendicular to flow (e.g. vertically if oriented horizontally, and horizontally if oriented vertically). This profile is substantially constant along a length of the foils, although this is by no means necessary. It is well known to vary the pitch cyclically to vary a lift of the foil 1. Increasing the angle of attack from zero until a stalling pitch is met, increases lift. By tilting the foil 1 so that it has a negative attack angle, a reversed foil is presented, and some lift in a negative direction can be obtained.

The wall 2 may be provided by a smooth structural surface to which the support structure is mounted. The wall may be elevated from a floor of a marine body that has partially obstructs the flow to accelerate the flow around the foil 1. An optional symmetric wall on an opposite side of the foil 1 may be provided to improve lift during part of the cycle where the foil 1 is distant the wall 2. Additionally sidewalls may be added to reduce losses due to tip vortex, providing the foil 1 with enclosures on 4 sides, effectively creating a nozzle.

Cycle 5 is coupled to a driveshaft such that power from the flow is coupled to a supply. The power may be provided in the reciprocating motion, and may be used to drive a pump, for example. Alternatively, and preferably, the reciprocating motion is coupled to a continuous or reversing rotating shaft. There are a variety of options for converting reciprocating translation (or other cyclic motion) into rotational motion, by composing simple machines, to provide high reliability, robust machines. The mechanism may couple intermittently to the drive, for example, during a part of an up stroke, only. This may not be preferable because intermittent coupling may complicate the mechanism, making it more susceptible to wear and requiring more maintenance, and furthermore requires some mechanism to return the foil to the power stroke. Both accelerated return stroke, and simplicity and reliability of the coupling mechanism can be provided by a continuous coupling in the form of a crankshaft/pushrod mechanism familiar from most transmissions in land vehicles.

Figure 1B:
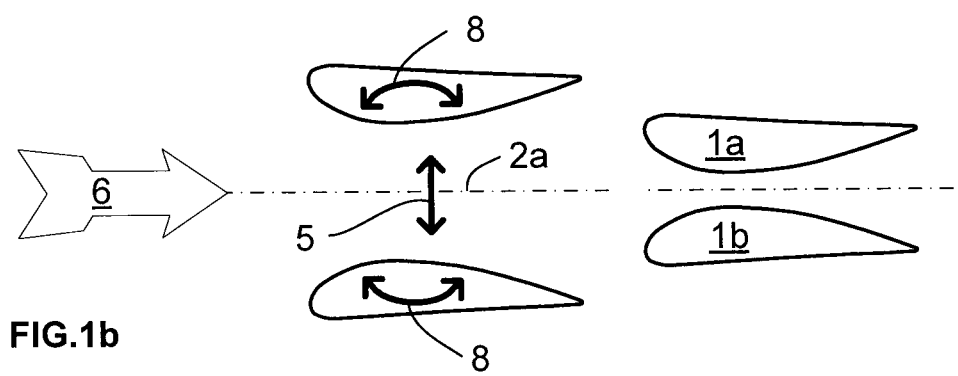

FIG. 1*b* schematically illustrates another embodiment of an oscillating foil turbine consisting of two foils 1*a*, and *b* both supported for motion as shown in FIG. 1*a*, but with one foil operating as a mirror image of the first. Like references refer to similar elements, and their description will not be repeated. A mechanism for driving the foils in their cycle 5 may be concentric, as shown or may be provided by distinct mechanisms at opposite sides with the foils 1*a*, and *b* in between. In this arrangement, an operationally defined ground 2*a* is produced at the plane of reflection. The lift of both foils 1*a*, and *b* are augmented by WIG effect, which is effectively increased. The power strokes of the two foils are simultaneous and move in opposite directions.

Figure 1C:
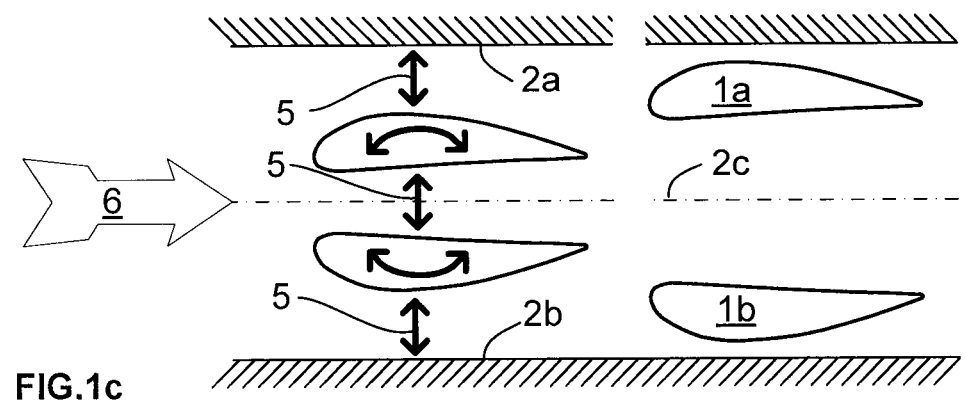

FIG. 1*c* schematically illustrates a third embodiment of an oscillating foil turbine consisting of two walls 2*a*, and *b*, an operationally defined ground 12*c*, and two foils 1*a*, and *b* both supported for motion as shown in FIG. 1*a*, with one foil operating as a mirror image of the first. Like references refer to similar elements, and their description will not be repeated. As such, the WIG effect is provided between the two foils, and between each foil and its proximal wall, at respective parts of the cycle. A mechanism for driving the foils in their cycle 5 may be concentric, as shown or may be provided by distinct mechanisms at opposite sides with the foils 1*a*, and *b* in between, or with some structural components in all three spaces around the two foils 1*a*, and *b*.

The foregoing cycles have power imbalances, in that drive force varies with position within the cycle, and in some cases this may be considerable. Even if the foils have symmetric profiles or are compliant and reverse their profiles at ends of the stroke, during the pitch reversal, substantially no power is being applied to the drive. It is known to smooth the power to a driven member using a governor, such as a controlled fly wheel that stores rotational energy during bursts of power, and adds the stored energy during low rotational energy periods. Alternatively or additionally, multiple oscillating foil turbines may be arranged in stages akin to a multi-piston engine.

The stages may be deployed in a variety of arrangements. The stages may be arranged side-by-side (offset in the direction of the pitch axis), stacked (offset in the heave direction), or in a tandem arrangement (offset in the surge direction, fore and aft). The latter option has an advantage in that the fore generator slows the velocity of fluid delivered to the aft foil. As such, equal force per cycle is not achieved by the two stages, unless a larger pitch or heave amplitude or both is given to the aft stage, and each subsequent fore-aft stage provides increasingly diminished returns. A spacing between the fore and aft foil can permit substantial restoration of the velocity, and therefore a power of the aft stage(s) can be selected by choosing this spacing. Side-by-side arrangements have the advantage of permitting a single axis to be defined through any number of stages, avoiding more expensive, complicated, lossy, higher maintenance, couplers. An advantage of the stacked arrangement is decreasing the distance between the stages (especially with low amplitude oscillation and low profile foils) reduces losses that are proportional to a length of the axis.

Figure 2:
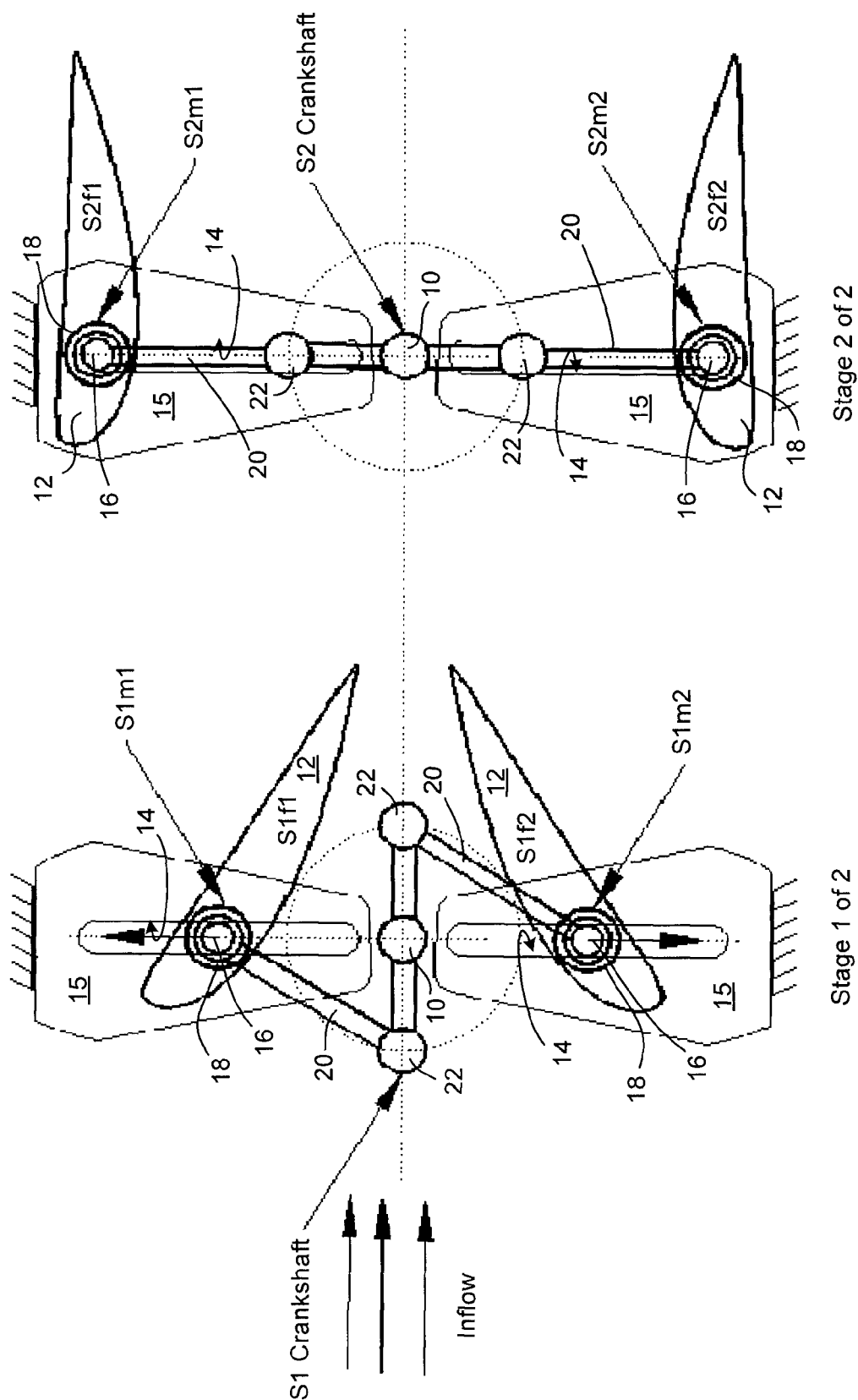
FIG. 2 is a schematic illustration of a 2-stage, oscillating foil turbine with a preferred mechanism for coupling the foils to a drive system.

FIG. 2 schematically illustrates a modified side view of a 2-stage oscillating foil turbine (horizontal foil arrangement), showing a crankshaft/pushrod mechanism for coupling cyclic linear reciprocation (one form of oscillation) to a shaft 10, to rotate the shaft 10. The modified side view affords side views of both stages, with the second stage translated to the right. The foils and supporting frame are completely immersed in a tidal marine body, and was designed to remain at a stable elevation from the bed. This may be accomplished with a variety of means including anchors and a buoyant supporting structure, a rigid frame resting or drilled into the bed, or a rigid frame supported from the surface, for example. It will be appreciated that design choices to produce a wind-based oscillating foil turbine are within the ordinary skill in the art.

Each stage is of a same construction, and should provide substantially the same power cycle if equally placed in a marine current covering equal flow volumes with the same pitch and amplitude control. Each stage includes 2 foils 12 supported for linear reciprocation by a respective guideway 14 of a structural supporting member 15. Each stage includes two top and bottom halves that are also symmetric, and of the same construction. Each half includes a foil 12, having a rigid protrusion 16 received in the guideway 14, which constrains the motion of the foil 12 to linear reciprocation. The rigid protrusion 16 is on an axis of the foil 12, and includes a driven rotational coupler 18 that permits pitch control, a driver for which bears against a pushrod 20 coupled to torque bearing surfaces 22 of shaft 10. As shown, the bottom and top foil pushrods 20 bear on rotationally symmetric torque bearing surfaces 22 that are separated horizontally; and as not shown, the shaft 10 extends continuously through the two stages. FIG. 2 shows the side view of two stages (S1 and S2) that are 90° out of phase with respect to each other, suggesting that two other stages are also coupled to the drive. In fact any number of stages may be used, and optimization would depend on many parameters.

In operation, the pushrods 20 coupled to the pitch controlling rotational coupler 18 at one end, and to a revolute joint at the torque bearing surface 22, mechanically link the reciprocating motion with the motion of the shaft 10. Thus a crankshaft coupled to the foil 12 by pushrods 20, translates the foil's heave motion into rotation of the shaft 10. Given the foil's pitch angles, the crank shaft should rotate in the clockwise direction. Naturally the tidal machine is designed for continuous operation passing through repeated cycles, each cycle operates with a mirror symmetry that ensures that the two foils in each phase create an operational ground between them. The coupling of the crank arms to the foils ensures that the crank shaft is continuously rotated by cycling of the foils.

Each foil 12 is constrained to reciprocate in its guideway 14 in a vertical direction perpendicular to flow (although by rotating the oscillating foil turbine 90°, the same oscillating foil turbine design could be used in a vertical arrangement, where the foils would move in a horizontal direction perpendicular to flow). The pitch controlling rotational coupler 18 are driven to vary a lift of the foil 12.

While a 2-foil stage is shown, it will be appreciated that a single foil stage can be provided by removing half of the machinery and this single foil arrangement may be preferred in certain applications. The same WIG effect is provided by the single foil stage arrangement, which has a lower profile, and may have top and bottoms walls on both sides substantially between the pushrods 20 across a span of the foil 12.

Figure 3:
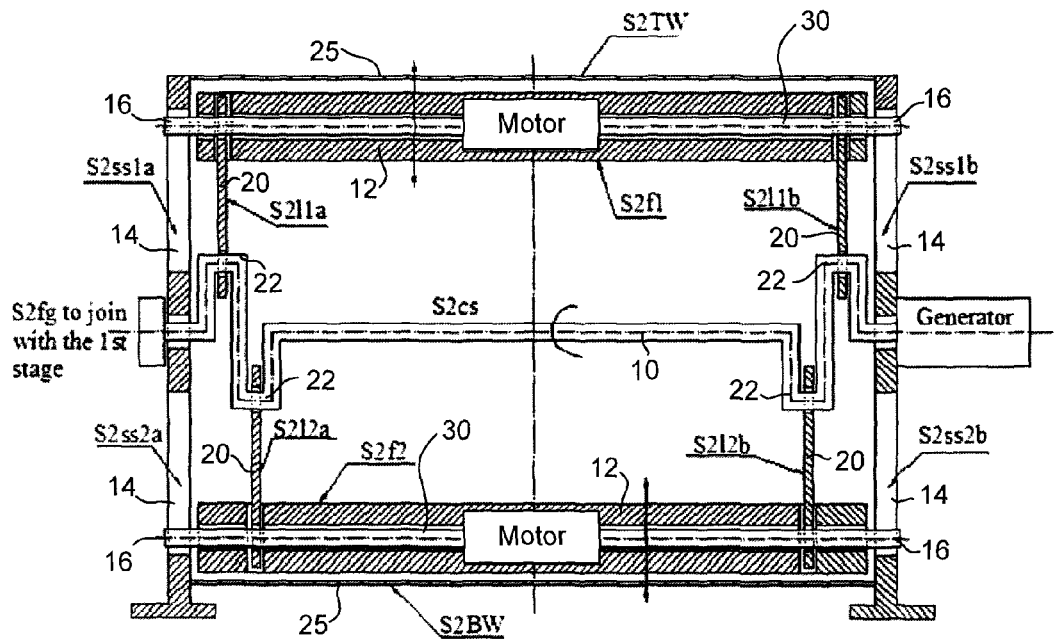
FIG. 3 is a schematic illustration of a single stage of an oscillating foil turbine having a 2-foil structure, each foil leveraging a static WIG effect.

FIG. 3 is a schematic front view of a stage of a WIG effect oscillating foil turbine designed to be completely immersed in a tidal marine body. Like references refer to similar elements, and their description will not be repeated. The span of the foils 12 extend from side to side in the horizontal direction perpendicular to the flow, which is directed into the page. Passing through the foils is an axle 30 that provides the protrusion 16 that extends through a guideway 14 in the support 15. The axle 30 is driven by one (or more motors) retained within the foil's 12. This coupling provides for limited vertical translation, as well as controlled pitch movement. The pitch control motors are therefore isolated and protected from the environment. The axles 30 of the foils 12 are always parallel, and are separated by a distance that varies between a minimum and maximum distance.

The stage is shown with foils 12 at the maximum distance. As the minimum possible gap between the two foils at the (proximal) part of the stroke, where the foils are closest is the outer diameter of the crankshaft, the minimum possible distance between the two foils are typically to be too large to effectively interact with each other, to create a strong WIG effect in this embodiment. Walls 25 below and above the foils can be positioned as close as desired to the foils 12, making an effective WIG effect possible. The walls 25 are rigid and inelastic so that they are minimally deflected by the substantial pressures applied thereto during operation.

Supporting the foil at ends improves losses associated with support structure obstructing the inflow and/or the outflow, decreases a cantilever distance, and distributes load on the pitch motors, and the support frame. The stage shown is coupled on one end to another stage, and at the other to a generator.

A partial mid wall may extend around the shaft 10 between the foils (above and below) and between the crankpins to further provide substantial static WIG effect for the foils throughout the majority of the foil 12, the midwall may have openings sufficient for the crankpins and pushrods 20 to move freely, but otherwise fill the space providing close walls (within at least 20% the chord length of the foil 12). The crankpins and pushrods 20 may also be located on the other side of the support 15 than what is shown. Doing so permits the foils to be much closer, as clearance only for the outer dimension of the shaft 10 and not the crankpins 22 would be required.

Figure 4:
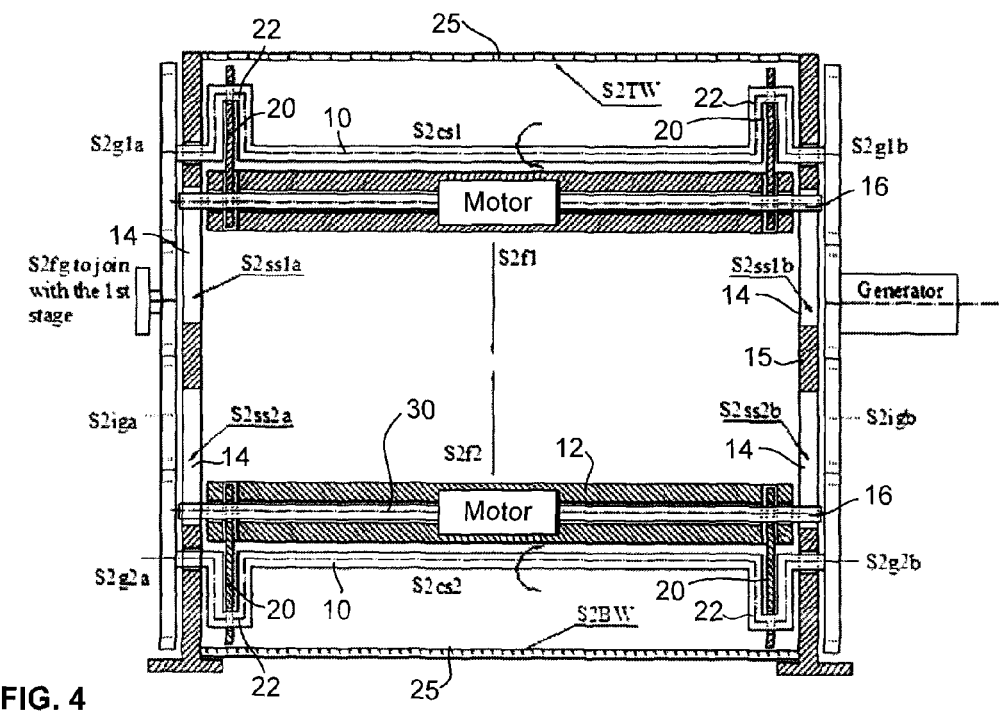
FIG. 4 is a schematic illustration of a single stage of an oscillating foil turbine having a 2-foil structure, the foils producing a dynamic WIG effect.

FIG. 4 shows an alternative arrangement to a single crank shaft intermediate the foils 12. Like references refer to similar elements, and their description will not be repeated. The two crankshafts provided above and below both foils are coupled, to an intermediate stage, as shown by gears. However it will be appreciated by those of skill in the art that they could be coupled directly and independently to the adjacent stage or using a belt or chain drive for example. The first and second stages are preferably coupled to drive a generator, for example by a like system.

Applicant has determined from simulation work that for an oscillating foil turbine configuration of FIG. 4 without top and bottom walls, with a continuous drive pitch motor driven in a trapezoidal pitching function, with foils having an aspect ratio of 2.5-5.0, a 2 foil stage generates significant power in a flow similar to what is provided, for example, at the Bay of Fundy. Power consumed by the motor per cycle is less than 5%, more preferably less than 2.5%, and preferably less than 1% of the power generated.

In fluid dynamics, walls provide confinement and can accelerate, and control flow. While top and/or bottom walls may also enhance lift via the WIG effect, they can also be used for such purposes without the WIG effect. For example, sidewalls in horizontally oriented layouts, and end walls in vertically oriented layouts may be provided to reduce tip vortex caused losses. FIG. 5 schematically illustrates front and side views of a nozzle based WIG oscillating foil turbine that includes walls 25 to produce static WIG effect, and side walls 35 for reducing tip vortex caused losses. The operationally produced ground plane is also schematically illustrated by a dotted line. The side walls 35 and walls 25 form a chamber for the foils closed on 4 sides. The foil shown has a reversible profile permitting the turbine to operate in exactly the same manner in flows that reverse, during flow in either direction. Alternatively walls 25 may be displaced for rotating the foils 90° in preparation for a reversal of the flow, driven by the pitch motors, for example. Thus the oscillating foil turbines in accordance with the present invention may operate during both flow conditions in a reversing flow, switching for example at high tide and low tide.

FIG. 6 shows a further embodiment of the invention that uses symmetric (elliptical) foils and can be used in reversing flows. The embodiment includes 2 pairs of WIG effect foils on each side of a housing 33. The housing 33 houses 4 crankshafts, one for each set of two foils that have collinear axes, and are disposed on right and left sides of the housing 33, such that one crankshaft is directly coupled to top fore foils, one for top aft foils, one for bottom fore and one for bottom aft foils. From another point of view, the foils that are connected to a common crankshaft can be considered to be one foil, supported at their middle. The housing 33 provides a side wall 35. One advantage of this design is that the flow may be fully reversible and both stages are collocated which is good for water proof and mechanical parts integration. While it was noted above that fore-aft arrangements provide some disadvantage in that the flow velocity across the aft foil is weaker than in the fore, it is known to require a larger pitch or heave amplitude or both for the aft foils to produce the same amount of energy, to provide equivalent power to both.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. An oscillating foil turbine for tapping fluid kinetic energy from a reversible flow comprising:
   a first foil having a chord length and a first fluid dynamic surface designed to produce lift, mounted to a support for cyclic oscillation in the flow, with substantial motion in a first direction perpendicular to the flow, the first fluid dynamic surface having first and second sides, and the first foil is a reversible foil equally operable in flows in two opposite directions;
   a second fluid dynamic surface operating in the flow to produce an effective ground parallel to a direction of the flow and perpendicular to the first direction; and
   a member coupled directly or indirectly to the first foil, adapted to use the motion in the first direction to perform work,
   wherein throughout a portion of the cycle the first side of the first fluid dynamic surface is separated from the effective ground by less than about 20% of the chord length, and the effective ground has an extent such that at least 80% of the first foil is projected onto the effective ground in the first direction.

2. The oscillating foil turbine of claim 1 wherein the flow is a reversing marine flow or a wind.

3. The oscillating foil turbine of claim 1 wherein the second fluid dynamic surface is a wall defining the ground, the wall having an extent such that at least 90%, more preferably 95-295%, more preferably 100-150%, and more preferably still about 105-125% of the first foil is projected onto the effective ground in the first direction.

4. The oscillating foil turbine of claim 1 wherein the first foil is a cambered foil, and the first side of the first fluid dynamic surface is a flat side of the first foil.

5. The oscillating foil turbine of claim 1 wherein the support comprises a frame including a pair of slits through which a pair of rigid protrusions disposed at opposite ends of the first foil pass to define a pivot axis of the first foil, the slits and rigid protrusions providing translational or revolute translational joints for coupling the first foil to the pair of slits, the joints substantially preventing the first foil from roll, sway, or yaw motion.

6. The oscillating foil turbine of claim 1 wherein the second fluid dynamic surface is on a second foil moved to operationally provide the effective ground with the first foil, and the first and second fluid dynamic surfaces are both suction surfaces, or both pressurized surfaces of the first and second foils, the first and second foils: being similar in size and contour, moving at the same rates throughout the portion of the cycle; and having similar angles of attack throughout the portion of the cycle, to provide a mirror symmetry between the first and second foils.

7. The oscillating foil turbine of claim 1, further comprising a sidewall extending normal to the pitch axis of the first foil.

8. An oscillating foil turbine for tapping fluid kinetic energy from a flow comprising:
   a first foil having a chord length and a first fluid dynamic surface designed to produce lift, mounted to a support for cyclic oscillation in the flow, with substantial motion in a first direction perpendicular to the flow, the first fluid dynamic surface having first and second sides, wherein the support comprises a guideway through which rigid protrusions of the foil pass, providing a translational joint for coupling the foil to a frame, the guideway oriented substantially in the first direction;
   a second fluid dynamic surface operating in the flow to produce an effective ground parallel to a direction of the flow and perpendicular to the first direction; and
   a member coupled directly or indirectly to the first foil, adapted to use the motion in the first direction to perform work,
   wherein throughout a portion of the cycle the first side of the first fluid dynamic surface is separated from the effective ground by less than about 20% of the chord length, and the effective ground has an extent such that at least 80% of the first foil is projected onto the effective ground in the first direction.

9. The oscillating foil turbine of claim 8 wherein the work done drives an electrical power generator, or a pump.

10. The oscillating foil turbine of claim 8 wherein the flow is a marine flow or a wind.

11. The oscillating foil turbine of claim 8 wherein the second fluid dynamic surface is a wall defining the ground, the wall having an extent such that at least 90%, more preferably 95-295%, more preferably 100-150%, and more preferably still about 105-125% of the first foil is projected onto the effective ground in the first direction.

12. The oscillating foil turbine of claim 8 wherein the first foil is a cambered foil, and the first side of the first fluid dynamic surface is a flat side of the first foil.

13. The oscillating foil turbine of claim 8 wherein the guideway comprises a pair of slits through which a pair of rigid protrusions disposed at opposite ends of the first foil pass to define a pivot axis of the first foil, the slits and rigid protrusions providing translational or revolute translational joints for coupling the first foil to the pair of slits, the joints substantially preventing the first foil from roll, sway, or yaw motion.

14. The oscillating foil turbine of claim 8, further comprising a sidewall extending normal to the pitch axis of the foil.

15. The oscillating foil turbine of claim 8 wherein the second fluid dynamic surface is on a second foil moved to operationally provide the effective ground with the first foil, and the first and second fluid dynamic surfaces are both suction surfaces, or both pressurized surfaces of the first and second foils, the first and second foils: being similar in size and contour, moving at the same rates throughout the portion of the cycle; and having similar angles of attack throughout the portion of the cycle, to provide a mirror symmetry between the first and second foils.

16. The oscillating foil turbine of claim 15 wherein the first and second foils are both coupled to a frame for controlled variation of angles of attack of the foils during the cycle.

17. The oscillating foil turbine of claim 15 wherein the first and second foils are both coupled to a frame for controlled variation of angles of attack of the foils during the cycle.

18. The oscillating foil turbine of claim 15 wherein the first and second foils are both coupled to a frame by a mechanical controller that controls variation of angles of attack of the foils during the cycle.

19. The oscillating foil turbine of claim 15 wherein each of the first and second foils are coupled to a frame via an axle of a rotary motor embedded in the foil for controlled variation of an angle of attack of the foil during the cycle, the axle meeting a rotationally bearing surface of the frame or of a drive train for grounding the pitching of the foil.

20. The oscillating foil turbine of claim 15 wherein each of the first and second foils are coupled to a frame via an axle of a rotary motor embedded in the foil for controlled variation of an angle of attack of the foil during the cycle, the axle meeting a rotationally bearing surface of the frame or of a drive train for grounding the pitching of the foil, wherein a locking mechanism is set at a fixed angle of attack at a beginning of each stroke and released at the end of each stroke, whereby the rotary motor operates only during pitching intervals between strokes.

21. An oscillating foil turbine for tapping fluid kinetic energy from a flow comprising:
 a first foil having a chord length and a first fluid dynamic surface designed to produce lift, mounted to a support for cyclic oscillation in the flow, with substantial motion in a first direction perpendicular to the flow, the first fluid dynamic surface having first and second sides;
 a second fluid dynamic surface operating in the flow to produce an effective ground parallel to a direction of the flow and perpendicular to the first direction; and
 a reciprocating pushrod extending from the first foil substantially in the first direction and adapted to use the motion in the first direction to perform work,
 wherein throughout a portion of the cycle the first side of the first fluid dynamic surface is separated from the effective ground by less than about 20% of the chord length, and the effective ground has an extent such that at least 80% of the first foil is projected onto the effective ground in the first direction.

22. The oscillating foil turbine of claim 21 wherein the reciprocating pushrod extending is coupled to a crankshaft for continuous rotation of the crankshaft, and the work is done by the crankshaft.

23. The oscillating foil turbine of claim 21 wherein the work done drives an electrical power generator, or a pump.

24. The oscillating foil turbine of claim 21, further comprising a sidewall extending normal to the pitch axis of the foils.

25. The oscillating foil turbine of claim 21 wherein the flow is a marine flow or a wind.

26. The oscillating foil turbine of claim 21 wherein the second fluid dynamic surface is a wall defining the ground, the wall having an extent such that at least 90%, more preferably 95-295%, more preferably 100-150%, and more preferably still about 105-125% of the first foil is projected onto the effective ground in the first direction.

27. The oscillating foil turbine of claim 21 wherein the first foil is a cambered foil, and the first side of the first fluid dynamic surface is a flat side of the first foil.

28. The oscillating foil turbine of claim 21 wherein the guideway comprises a pair of slits through which a pair of rigid protrusions disposed at opposite ends of the first foil pass to define a pivot axis of the first foil, the slits and rigid protrusions providing translational or revolute translational joints for coupling the first foil to the pair of slits, the joints substantially preventing the first foil from roll, sway, or yaw motion.

29. The oscillating foil turbine of claim 21 wherein the second fluid dynamic surface is on a second foil moved to operationally provide the effective ground with the first foil, and the first and second fluid dynamic surfaces are both suction surfaces, or both pressurized surfaces of the first and second foils, the first and second foils: being similar in size and contour, moving at the same rates throughout the portion of the cycle; and having similar angles of attack throughout the portion of the cycle, to provide a mirror symmetry between the first and second foils.

30. The oscillating foil turbine of claim 29 wherein the first and second foils are both coupled to a frame for controlled variation of angles of attack of the foils during the cycle.

31. The oscillating foil turbine of claim 29 wherein the first and second foils are both coupled to a frame for controlled variation of angles of attack of the foils during the cycle.

32. The oscillating foil turbine of claim 29 wherein the first and second foils are both coupled to a frame by a mechanical controller that controls variation of angles of attack of the foils during the cycle.

* * * * *